Dec. 28, 1954  W. H. SILVER ET AL  2,697,973
HITCH CONNECTION FOR PLOWS

Original Filed Dec. 29, 1949  2 Sheets-Sheet 1

WITNESS
E. B. Bjurstrom

INVENTORS
WALTER H. SILVER
WILLIAM V. LOHRMAN
BY
ATTORNEYS

Dec. 28, 1954     W. H. SILVER ET AL     2,697,973
HITCH CONNECTION FOR PLOWS
Original Filed Dec. 29, 1949     2 Sheets-Sheet 2
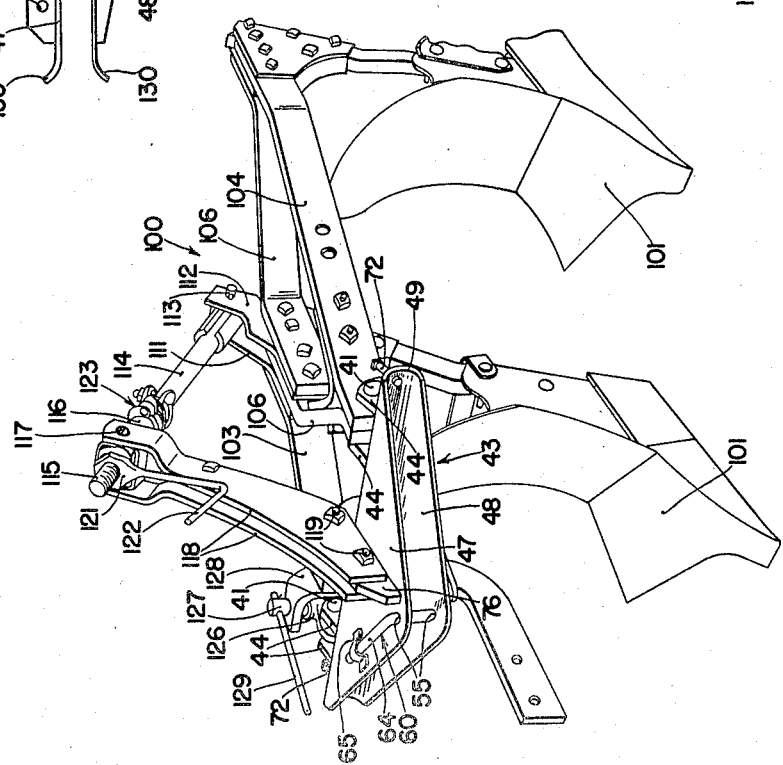
INVENTORS
WALTER H. SILVER
WILLIAM V. LOHRMAN
ATTORNEYS

United States Patent Office 2,697,973
Patented Dec. 28, 1954

2,697,973

HITCH CONNECTION FOR PLOWS

Walter H. Silver, Rock Island, Ill., and William V. Lohrman, Davenport, Iowa, assignors to Deere & Company, Moline, Ill., a corporation of Illinois Continuation of application Serial No. 135,643, December 29, 1949. This application February 4, 1952, Serial No. 269,846

13 Claims. (Cl. 97—47.14)

This application is a continuation of our co-pending application, Serial No. 135,643, filed December 29, 1949, now abandoned, which was a continuation of our previous application, Ser. No. 568,086, filed December 14, 1944, now abandoned.

The present invention relates generally to agricultural implements and more particularly to implements of an integral or direct connected type, adapted to be mounted on and supported substantially solely by a tractor or other propelling unit.

The object and general nature of the present invention is the provision of new and improved means for readily connecting an agricultural implement to the tractor and disconnecting it from the tractor, which connecting means readily accommodates different types of tools. Particularly, it is the feature of this invention to provide a quick detachable implement connection which may accommodate lateral swinging of the implement relative to the tractor where lateral swinging is desired. Further, it is a feature of this invention to provide such a connection which is adjustable to hold the implement against lateral swinging where lateral swinging is not desired. Further, it is a feature of this invention to provide a common attaching member which may be used with a number of different kinds of implements for connecting any one of them to a propelling and supporting tractor.

These and other objects and advantages of the present invention will be apparent to those skilled in the art after a consideration of the following detailed description, taken in conjunction with the accompanying drawings in which the preferred forms of the present invention have been illustrated.

In the drawings:

Figure 2 is a perspective view of a different type of implement attachable to the tractor in place of the implement shown in Figure 1.

Figure 3 is a perspective view of an attaching saddle member.

Figure 4 is a perspective view of the removable hitch pin.

Figures 5 and 6 are modified forms of the saddle member.

Figure 1:
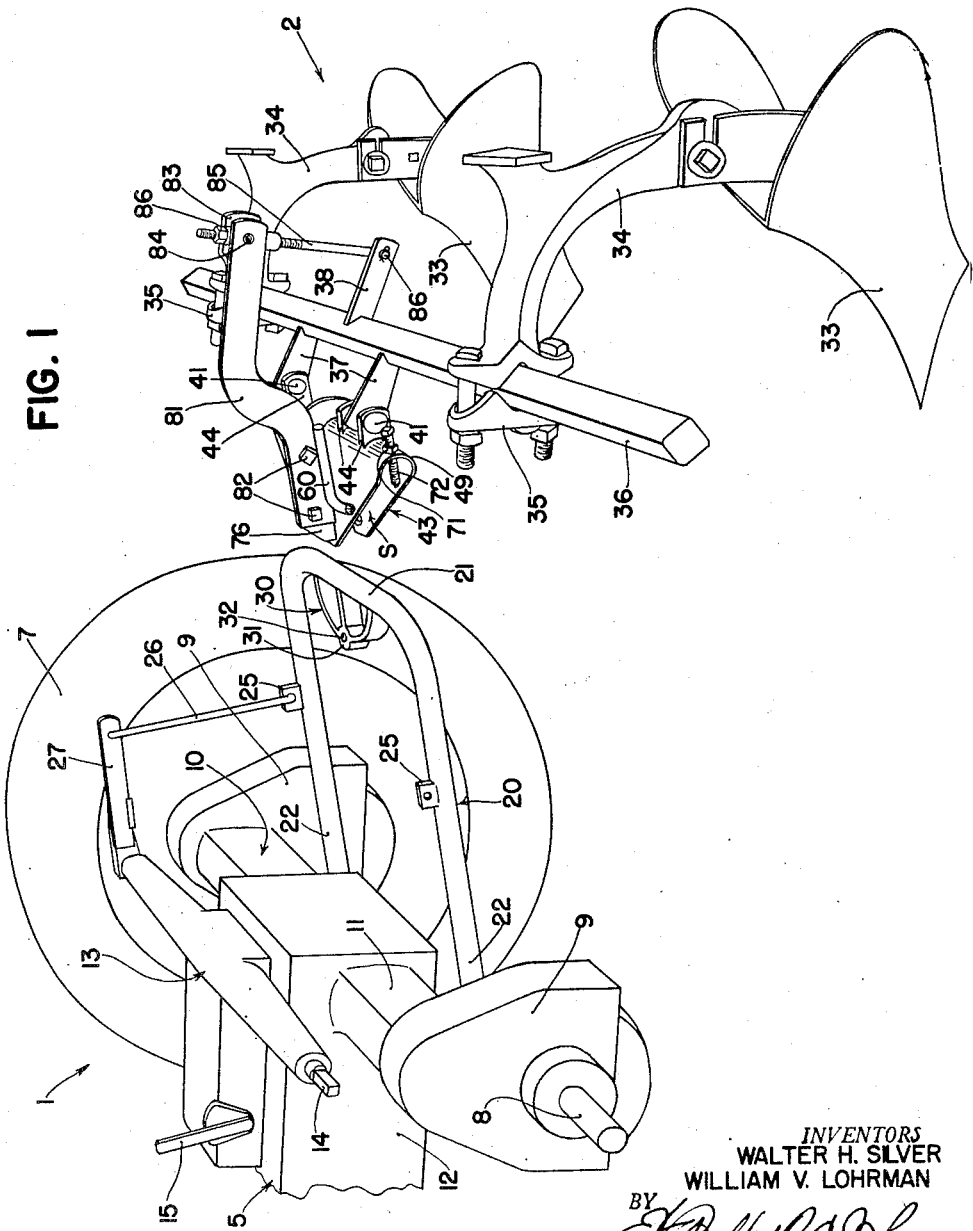
Figure 1 is a perspective view of a tractor and implement, in which the principles of the present invention have been incorporated, the implement being shown separated from the tractor to illustrate the method of quickly attaching and detaching the implement.

Referring now to the drawings, particularly Figure 1, the numeral 1 indicates the supporting and propelling tractor and the reference numeral 2 indicates an implement which is adapted to be connected with a tractor by the quick detachable means which forms the principal part of the present invention. The tractor 1 is of more or less conventional construction, so far as the present invention is concerned, comprising means serving as a supporting or propelling frame 5 carried on front steering wheels and rear traction wheels 7. The latter are mounted on axle shafts 8 which are journaled in the lower portions of depending drive housings 9 forming a part of a rear axle 10. The latter comprises rear axle extensions 11 which are secured by bolts or the like to the rear end of a transmission case 12 which forms the principal portion of the frame 5 of the tractor. The tractor 1 is equipped with a power lift apparatus, indicated in its entirety by the reference numeral 13. The present invention is not particularly concerned with the details of the power lift apparatus, which is somewhat similar to that disclosed in the United States patent to E. McCormick et al. 2,107,760, dated December 8, 1938, and includes the hydraulic piston and cylinder unit that is connected to actuate a transverse power lift rockshaft 14 and dispose the same in different positions under the control of hydraulic valve means 15. By operating the latter, the power lift rockshaft 14 may be rocked through approximately sixty degrees, more or less, or held in any intermediate position between the end positions.

Referring now to the features with which the present invention is more particularly concerned, the tractor 1 is provided with a U-shaped bail or drawbar 20 which is arranged with its intermediate section 21 disposed rearwardly and the end portions 22 disposed forwardly and pivotally connected by any suitable means to the drive housings 9, preferably the forward part thereof. The tractor drawbar 20 constitutes a tractor hitch part and the intermediate section 21 is preferably in the form of a horizontal elongated bar. Each of the bail side members 22 is provided with a lug 25 which is apertured to receive the lower end of a lifting link 26, the upper end of which is pivotally connected to the rear portion of a power lift arm 27 that is fastened to the power lift shaft 14. For purposes of disclosure, the power lift arm 27 and link 26 on the near side of the tractor, as viewed in Figure 1, have been omitted. The bail member 20 may be raised or lowered or held in any intermediate position by proper actuation of the hydraulic valve 15. A connecting element in the form of a pivot member 30 is rigidly secured, as by welding, to the intermediate portion 21 of the bail 20 and is provided with a forwardly disposed boss section 31 which is vertically apertured, as at 32, to receive a pivot pin by which implements may be connected to the drawbar 20.

One of the implements that is adapted to be connected and disconnected readily is indicated in Figure 1 by the reference numeral 2 and comprises a lister or middlebreaker having two middlebreaker bottoms 33 connected, respectively, to the lower ends of shanks 34, the upper ends of which are fixed, as by clamps 35, to a square tool bar 36. The latter is provided with a pair of arms 37 extending generally forwardly and a central arm 38 extending generally rearwardly, the outer ends of these arms being apertured. The forward ends of the arms 37 are connected by means of pivot pins 41 to a U-shaped saddle member 43. The latter member constitutes an implement hitch part in the form of a generally horizontal member having upper and lower bar-engaging plate-like sections, as pointed out below, the width of the member 43, generally transversely of the implement, being substantially the same as the length of the intermediate section 21 of the tractor drawbar 20. Preferably, the pivot pins are carried by pairs of lugs 44 formed on or secured to, as by welding, the saddle member 43. The latter member comprises a plate bent, as best shown in Figures 2 and 3, into generally U-shaped configuration with upper and lower generally flat or plate-like sections 47 and 48 having forwardly converging edges and connected together by a rounded rear portion 49 forming the wider part of the saddle member. Each of the lugs 44 is apertured, as at 51 (Figure 3), to receive the associated pivot pins 41. The forward or apical portions of the upper and lower plate sections 47 and 48 are apertured, as at 55, to receive a main connecting pivot pin 60 (Figure 4), and the rear portions of the sections 47 and 48, together with the rear portion 49, that may be considered as joined to the lower section 48 and extending upwardly therefrom, form a forwardly opening pocket structure S. The upper section 47 may be considered as joined to said upwardly extending section 49 and as extending forwardly therefrom over the bar 21, when the implement 2 is attached to the tractor 1. The pin 60 includes a vertical connecting section 61, the lower end of which is tapered, as at 62, to facilitate passing the same through the openings 55 and the opening 32 in the bail member 30. The pin 60 includes a handle section 64 which, after the implement has been connected, may be passed under a spring clip 65 for holding the pin against accidental displacement. The position of the pin 60 relative to the saddle member 43 when the implement is attached to the tractor is shown in Figure 2. The right and left ends of the U-shaped section 49 of the saddle member 43 is apertured and carries, welded thereto, nut members 71 into each of which a set screw 72 is threaded. As will be explained later in detail, the purpose of the set screws is to provide for or prevent, as desired, lateral swinging of the implement about the vertical axis of connection, as defined by the pivot pin 60, with the tractor. The saddle member 43 also includes a vertical flange member 76, preferably secured by welding or the like to the plate making up the saddle sections 47, 48 and 49. As best shown in Figure 3, the attaching flange 76 is provided with a plurality of apertures 77 to provide for convenient attachment of different implement parts.

For example, when the lister 2 shown in Figure 1 is attached, an adjusting arm 81 is bolted, as at 82, to the flange 76. The arm 81 preferably extends generally rearwardly and is provided with a hammer strap 83. The latter and the rear end of the arm 81 are apertured to receive a trunnion member 84 through which an adjusting threaded rod 85 extends. Lock nuts 86 are disposed on the rod 85 above and below the trunnion member 84 so as to provide for adjusting the position of the rod 85. The lower end of the latter is turned to form a hook or pivot section 86 that is received in the rear end of the rearwardly extending central arm 38. By adjusting the rod 85 vertically, the implement 2 may be swung about its pivot connection, as at 41, with the saddle member 43. It will be seen, particularly from Figure 1, that the upper and lower sections 47 and 48 of the attaching saddle member 43 are spaced apart to receive the rear portion of the bail 20 and particularly to receive the pivot member 30 which is rigidly secured to the bail. Since the plates 47 and 48 embrace the pivot member 30 it will be seen that the saddle member 43 is held against vertical movement relative to the bail 20, but nevertheless the saddle member 43 is permitted to swing laterally with respect to the bail about the axis defined by the pin 60, to the extent permitted by the screws 72. If the latter are run forwardly far enough they will serve to prevent the saddle member 43 from swinging, but if they are backed away they permit the saddle member 43 to pivot laterally. Some implements require that such lateral pivoting be prevented while other implements are such that lateral swinging is desirable. For example, the middlebreaker implement 2 is of the type in which lateral swinging about the pivot pin 60 is not desirable, and hence, as shown in Figure 1, the set screws 72 are run forwardly a sufficient distance so that, when the implement is attached to the bail 20, the forward ends of the set screws engage the rear side of the bail 20 and hold the saddle member 43 against lateral swinging. Thus, the set screws 72, as best shown in Figure 2, constitute means carried by the socket or pocket structure spaced lengthwise of the bar 21 and acting between the latter and the socket member 20 for limiting lateral swinging of the part 20 relative to the tractor drawbar 20 about the pivot pin 60. Further, in this position of the set screws 72, connecting the implement to the tractor is facilitated in that, when the tractor drawbar is backed into full engagement with the saddle member 43, the apertures 31 and 55 are aligned so far as their relation in a fore-and-aft direction is concerned. In the implement shown in Figure 1, adjusting the rod 85 vertically serves to adjust the depth of operation by giving the bottoms 33 more or less suck.

In Figure 2 we have shown an implement 100 of the type that preferably is connected with the bail 20 for at least limited lateral swinging movement about the axis of the attaching hitch pin 60. The implement 100 is a two-bottom plow, including plow bottoms 101 secured to the rear ends of plow beams 103 and 104 which are connected together by braces 105 and 106 constructed generally along the lines of conventional plow manufacture. The plow 100 is provided with a pair of brackets 111 and 112 secured rigidly to the plow frame and apertured to receive a pivot member 113 by which the rear end of a strut 114 is pivotally connected thereto. The forward end of the strut 114 is screw threaded, as at 115, and rearwardly of the screw threaded portion 115 a strut passes through a sleeve member 116 pivoted, as by trunnions 117 or the like to the upper ends of a pair of brackets 118 that are bolted, as at 119, to the attaching flange 76. A nut member 121 is screwed onto the threaded end 115 and is provided with a handle section 122, and rearwardly of the sleeve 116 a friction clamp unit is placed about the strut 114, the latter thus being held against sliding through the sleeve member 116 by the friction clamp unit 123. If, however, the load becomes excessive, the friction clamp unit 123 yields, sliding rearwardly on the strut 114 and permitting the latter to shift forwardly through the sleeve 116, the forward ends of the plow beams 103 and 104 being mounted on the pivot pins 41, as described above in connection with Figure 1.

The plow shown in Figure 2 is leveled by virtue of a vertically shiftable lug 126 having a screw threaded sleeve receiving an adjusting screw 127, the latter being mounted in a U-shaped yoke 128 fixed to the forward end of the right-hand plow beam 103. A handle 129 is provided for turning the screw 127 so as to run the lug 126 upwardly or downwardly relative to the plow beam 103 for leveling the plow bottoms relative to the saddle member 43. The depth of penetration of the plow bottoms is adjusted by turning the nut member 121 in one direction or the other so as to pivot the plow beams about the pivot pins 41.

It will be noted, particularly from Figure 1, that the implement, either the one shown in Figure 1 or the implement shown in Figure 2, may readily be attached and detached.

For example, when attaching the implement shown in Figure 1, all that it is necessary to do is to back the tractor and at the same time manipulate the valve 115 to raise or lower the drawbar 20 until the center section 21 is in a position to enter the saddle member 43. The latter provides, in effect, a socket S which is open at its front end to receive the tractor drawbar or bail. When the bail seats in the socket S the pin 60 is inserted through the saddle member openings 55 and through the bail opening 32. The lower end 62 of the pivot pin 60 is tapered to facilitate inserting the pivot pin. Under certain conditions it may be desirable to provide for guiding the bail into position as the tractor is backed, and to this end the forward edges of the saddle plate sections 47 and 48 may be flared, as best shown in Figure 5 where the flared lip portions are indicated by the reference numeral 103, or the upper lip portion 131 (see Figure 6) may overhang the lower lip portion whereby it would be possible to back the tractor up to the saddle member and then raise the bail 20 until it engaged the overhanging upper lip portion whereupon the tractor may be backed an additional amount sufficient to seat the bail in the saddle member without requiring the operator to manipulate the lift mechanism back and forth in order to find the proper location of the bail with respect to the saddle member. This is a particular advantage where the tractor bail is a square bar rather than a round bar as shown in Figure 1. If desired, the lower plate 48 may have a downturned abutment edge 132 to serve as a locating part when the forwardly overhanging lip 131 is used.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim and desire to secure by Letters Patent is:

1. In a tractor-drawn outfit, an implement including agricultural tool means, a U-shaped saddle member pivotally connected with said tool means and having a central flange, an arm connected thereto, and means acting between said arm and said tool means for adjusting the position of the tool means relative to said saddle member, and means on the tractor to snugly receive said U-shaped saddle member and to hold the latter against vertical movement relative thereto.

2. In an agricultural implement, an attaching member comprising a plate bent to form a U-shaped part having upper and lower spaced apart sections, rearwardly extending lugs carried by the rear portion of said attaching member, and an attaching flange carried centrally by the upper portion of said plate member.

3. In an agricultural implement, an attaching member comprising a plate bent to form a U-shaped part having generally triangularly shaped upper and lower sections with their apices disposed forwardly and apertured, implement-receiving means on said plate member, a pivot pin disposable in the apertures of said sections, and means on one of said sections for holding said pivot pin in position.

4. For use with a tractor having a vertically swingable bail and means on the tractor for swinging said bail, the latter having a rear transverse portion and generally centrally thereof a lug extending forwardly from the forward edge of said transverse portion, the improvement comprising an agricultural machine including an agricultural tool, an attaching part including generally forwardly extending upper and lower plate-like sections, apertured at their forward portions, and a rear tool-receiving portion, said sections being spaced apart vertically to receive said rear transverse portion of said bail and said lug therebetween with said lug disposed between the forward apertured portions of said plate-like sections, the spacing of the latter being sufficiently close so that the attaching part is adapted to be held against movement relative to said bail in a generally vertical direction, and pivot means extending through the apertures in the forward portions of said spaced apart plate-like sections and the aperture in said lug for pivotally connecting said attaching part to said bail for lateral swinging movement relative thereto about a generally vertical axis disposed generally forward of the forward edge of the rear transverse portion of the tractor bail.

5. The invention defined in claim 4, further characterized by generally fore-and-aft extending set screw means carried by the laterally outer portions of said attaching part and engageable with the rear edge of the transverse portion of the tractor bail for limiting the swinging movement of said part laterally about the vertical axis defined by the pivot means in the apertures in the forward portion of said forwardly extending lug and in the forward portion of said forwardly extending plate-like sections, said last-mentioned means being adjustable relative to said part in a generally fore-and-aft direction so as to reduce or increase the permissive swinging movement of said part relative to the drawbar about said vertical axis.

6. The invention set forth in claim 4, further characterized by a transverse tool bar having a pair of forwardly extending laterally spaced lugs fixed to the bar between its ends, said agricultural tool being fixed to said bar and said tool-receiving portion having rearwardly extending lugs at its rear side, pivot means connecting the tool bar lugs with the lugs on the attaching part, an arm fixed to said attaching part and extending toward said bar, and means carried by the outer end of the arm and connectible with said bar for limiting movement thereof relative to the saddle member so as to adjust the position of the tool means relative to said attaching part.

7. The invention set forth in claim 6, further characterized by said tool bar extending at its ends laterally beyond said attaching part, and said pivot means connecting the central portion of said tool bar to said attaching part.

8. The invention set forth in claim 1, further characterized by said tool means including a plow frame extending generally rearwardly from its pivotal connection with the saddle member, a bracket carried by the plow frame disposed generally in the plane of said central flange, and a strut connected between said bracket and the outer end of said arm.

9. The invention set forth in claim 3, further characterized by bar-engaging parts adjustably connected with the ends of said U-shaped part for controlling its pivotal movement about the pivot axis defined by said pin.

10. The invention set forth in claim 4, further characterized by the upper of said spaced apart sections extending beyond the lower section to provide a drawbar-receiving portion adapted to guide a drawbar into a position to enter the space between said sections.

11. The invention set forth in claim 4, further characterized by the upper of said spaced apart sections extending beyond the lower section to provide a drawbar-receiving portion when the drawbar is raised thereagainst, and the adjacent edge portion of the lower section being extending downwardly to serve as an abutment for contact by the drawbar when maneuvering the latter into a position to be raised against said upper portion.

12. Hitch structure for connecting an implement to a tractor, comprising: a tractor hitch part including a horizontal, elongated bar, a member rigid on the bar substantially at a midpoint thereof and extending horizontally forwardly therefrom, the upper and lower portions of said forwardly extending member having upper and lower surfaces lying generally in the horizontal planes of the upper and lower sides of said elongated hitch bar, and means providing a vertical aperture in said member; and an implement hitch part including a lower generally horizontal plate-like element having a forward portion positionable below and engaging the lower face of said member and a rearward portion disposed below the bar and engageable with the underside of the latter, said plate-like element extending rearwardly beyond the bar, means providing a vertical aperture in the forward portion for alinement with the member aperture; a removable securing pin passing through said apertures, and means connected with the rearward portion providing a forwardly opening pocket structure separably receiving the bar and having a width substantially as great as the length of the bar, said pocket structure including a first portion joined to the rearward portion of the element and extending upwardly therefrom behind the bar, a second portion joined to said first portion and extending forwardly over the bar and substantially in contact with the upper side of the latter and the upper face of said forwardly extending member, and means spaced lengthwise of the bar and engageable between said pocket structure and the bar for limiting lateral swinging of the implement hitch part with respect to the tractor hitch part about the aforesaid securing pin.

13. Hitch structure as set forth in claim 12, further characterized by said pocket-forming structure being so dimensioned that when said elongated member of the tractor hitch part is in full engagement with the rear portion of said structure, said apertures are in alignment, whereby backing the tractor into said full engagement automatically aligns said apertures.

References Cited in the file of this patent

UNITED STATES PATENTS

| Number | Name | Date |
|---|---|---|
| 216,145 | Brown | June 3, 1879 |
| 323,228 | Sowers | July 28, 1885 |
| 636,572 | Sievers | Nov. 7, 1899 |
| 976,490 | Packham | Nov. 22, 1910 |
| 1,384,944 | Flood | July 19, 1921 |
| 1,431,815 | Kanke, Jr. | Oct. 10, 1922 |
| 1,529,425 | Ferguson | Mar. 10, 1925 |
| 1,556,508 | Hentzel | Oct. 6, 1925 |
| 1,775,297 | Towner | Sept. 9, 1930 |
| 1,939,950 | Brown | Dec. 19, 1933 |
| 2,027,852 | Allan | Jan. 14, 1936 |
| 2,386,378 | Wippel | Oct. 9, 1945 |
| 2,483,565 | Strandlund | Oct. 4, 1949 |
| 2,610,560 | Coultas et al. | Sept. 16, 1952 |

FOREIGN PATENTS

| Number | Country | Date |
|---|---|---|
| 499,323 | Canada | Jan. 19, 1954 |
| 37,406 | France | Sept. 2, 1930 |
| | (First addition to No. 660,922) | |
| 409,156 | Great Britain | Apr. 26, 1934 |